(12) United States Patent
Ishida et al.

(10) Patent No.: US 8,444,448 B2
(45) Date of Patent: May 21, 2013

(54) MANUFACTURING METHODS OF TOUCH PANEL, DISPLAY DEVICE, AND ELECTRONIC APPARATUS

(75) Inventors: Kohei Ishida, Suwa (JP); Kaoru Momose, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/719,164

(22) Filed: Mar. 8, 2010

(65) Prior Publication Data

US 2010/0233930 A1 Sep. 16, 2010

(30) Foreign Application Priority Data

Mar. 12, 2009 (JP) ................. 2009-059493

(51) Int. Cl.
*H01J 9/00* (2006.01)
*G06F 3/041* (2006.01)

(52) U.S. Cl.
USPC ............................................ 445/24; 345/173

(58) Field of Classification Search
USPC ............... 445/24; 345/173–174; 427/97.3
See application file for complete search history.

(56) References Cited

U.S. PATENT DOCUMENTS

| | | | |
|---|---|---|---|
| 5,392,058 A | 2/1995 | Tagawa | |
| 5,581,274 A | 12/1996 | Tagawa | |
| 5,869,790 A | 2/1999 | Shigetaka et al. | |
| 5,926,171 A | 7/1999 | Matsufusa et al. | |
| 2003/0234770 A1* | 12/2003 | MacKey | 345/173 |
| 2005/0030048 A1* | 2/2005 | Bolender et al. | 324/661 |
| 2006/0068525 A1* | 3/2006 | Uehara et al. | 438/125 |
| 2008/0309635 A1 | 12/2008 | Matsuo | |
| 2009/0002337 A1* | 1/2009 | Chang | 345/174 |
| 2010/0073310 A1* | 3/2010 | Liang et al. | 345/173 |
| 2010/0265207 A1* | 10/2010 | Chen | 345/174 |
| 2011/0025640 A1* | 2/2011 | Lin et al. | 345/174 |

FOREIGN PATENT DOCUMENTS

| | | |
|---|---|---|
| JP | 04-337824 | 11/1992 |
| JP | 06-318136 | 11/1994 |
| JP | 09-305289 | 11/1997 |
| JP | 10-063403 | 3/1998 |
| JP | 2008-310550 | 12/2008 |

* cited by examiner

*Primary Examiner* — Anh Mai
*Assistant Examiner* — Michael Santonocito
(74) *Attorney, Agent, or Firm* — Harness, Dickey & Pierce, P.L.C.

(57) ABSTRACT

A manufacturing method of a touch panel having a plurality of first electrodes and a plurality of second electrodes which are formed on one surface of a substrate and extend in directions crossing each other, includes: forming the second electrodes so as to be separated at intersections between the first and second electrodes on the substrate; forming the first electrodes at the intersections on the substrate; forming an insulating film at least on the first electrodes at the intersections using a printing method; and forming bridge wirings that connect the second electrodes separated at the intersections to each other over the insulating film using the printing method, wherein forming partition walls for partitioning at least a part of a profile shape of the insulating film is performed prior to the forming of the insulating film.

10 Claims, 11 Drawing Sheets

MANUFACTURING METHODS OF TOUCH PANEL, DISPLAY DEVICE, AND ELECTRONIC APPARATUS

BACKGROUND

1. Technical Field

The present invention relates to a manufacturing method of a touch panel, a manufacturing method of a display device, and a manufacturing method of an electronic apparatus.

2. Related Art

A capacitive touch screen has a configuration in which a capacitor is formed between a finger and an electrode of a panel when the finger or the like is brought close to a certain location on the panel having electrodes formed thereon and the certain location is detected by detecting a current that charges the formed capacitor. Examples of the capacitive touch screen are as follows.

A coordinate input device disclosed in JP-A-4-337824 has a configuration in which a liquid crystal layer is interposed between a substrate having X electrodes formed thereon and a substrate having Y electrodes formed thereon.

In addition, an electrode of a detection pen brought close to the X electrode side substrate forms a stray capacitor between the X and Y electrodes, and the position of the detection pen is detected from a voltage induced when the stray capacitor is charged (see JP-A-4-337824).

An information input/output device disclosed in JP-A-6-318136 has a configuration in which electrodes disposed in a matrix so as to correspond to respective pixels of a display portion and active elements provided for each electrode are formed on the same substrate. In addition, these electrodes serve as sensing electrodes when the positions are detected (see JP-A-6-318136).

A coordinate input device disclosed in JP-A-9-305289 has a configuration in which X and Y electrodes crossing each other are formed on each of the front and back surfaces of a sensing substrate. In addition, the position of a finger brought close to the X electrode side surface of the sensing substrate is detected from a change in current caused by a change in an electric field line extending from the X electrodes to the Y electrodes (see JP-A-9-305289).

A coordinate position input device disclosed in JP-A-10-063403 has a configuration in which a plurality of electrodes are provided which are disposed opposite each other with an insulating layer interposed therebetween and which cross each other. In addition, the position detection is performed by detecting a current changed by the operator's finger being brought close to the electrodes (see JP-A-10-063403).

However, the known techniques described above have the following problems.

In the inventions disclosed in JP-A-4-337824, JP-A-6-318136, JP-A-9-305289, and JP-A-10-063403, wiring layers are laminated by repeatedly performing a sputtering method, a photolithography method, an etching method, and the like a plural number of times when forming the electrodes extending in the respective directions or forming the electrodes and the active circuits on the same substrate. Accordingly, there has been a problem that the manufacturing cost increases.

For this reason, it may be considered to form the electrodes and the active circuits using a printing method, for example. In this case, however, if an insulating film is formed using a printing method, for example, swelling occurs and accordingly, steps are formed between both ends and a middle portion. Moreover, when electrodes, wirings, and the like are formed on the insulating film, disconnections are likely to occur since the electrodes and the wirings are easily bent at the steps. This may decrease the yield. Particularly, when the electrodes are formed in directions crossing each other, disconnections may occur easily in bridge wirings that are provided at the intersections of the electrodes.

SUMMARY

An advantage of some aspects of the invention is that it provides a manufacturing method of a touch panel, a manufacturing method of a display device, and a manufacturing method of an electronic apparatus capable of suppressing a decrease in the yield and of maintaining the quality even when a printing method is used.

According to an aspect of the invention, there is provided a manufacturing method of a touch panel having a plurality of first electrodes and a plurality of second electrodes which are formed on one surface of a substrate and extend in directions crossing each other including: forming the second electrodes so as to be separated at intersections between the first and second electrodes on the substrate; forming the first electrodes at the intersections on the substrate; forming an insulating film at least on the first electrodes at the intersections using a printing method; and forming bridge wirings that connect the second electrodes separated at the intersections to each other over the insulating film using the printing method. Forming partition walls for partitioning at least a part of a profile shape of the insulating film is performed prior to the forming of the insulating film.

In the manufacturing method of the touch panel of the above aspect of the invention, the insulating film forming material is partitioned by the partition walls when the insulating film is formed by a printing method. Accordingly, since surface tension acts on the insulating film, it is possible to suppress swelling and to make steps small. As a result, in the aspect of the invention, it is possible to decrease the amount of bending of the bridge wirings and to suppress the occurrence of disconnections.

It is preferable that the partition walls include the second electrodes separated at the intersections.

Accordingly, in the aspect of the invention, since the second electrodes are used as the partition walls, it is not necessary to perform an additional step of forming the partition walls. This can contribute to an improvement in manufacturing efficiency.

It is preferable that the first electrodes at the intersections are formed so as to be thinner than the second electrodes; and the insulating film is formed between the separated second electrodes so as to be approximately even with upper surfaces of the second electrodes.

Accordingly, in the aspect of the invention, since the bridge wirings are disposed on an approximately flat surface which is formed by the second electrodes and the insulating film without being bent, it is possible to effectively avoid disconnections of the bridge wirings.

It is preferable to further include: forming the second electrodes on the entire surface of the substrate; applying a photosensitizing agent onto the second electrodes; exposing the photosensitizing agent located at the intersections; and removing the exposed photosensitizing agent and the second electrodes which are located at the intersections. Preferably, the partition walls are the unexposed photosensitizing agent which remains after the removing of the exposed photosensitizing agent.

Accordingly, in the aspect of the invention, when the pattern of the second electrodes is formed using an exposure process such as photolithography, since the non-exposed photosensitizing agent remaining at the time of forming the insulating film can be used as the partition walls, it is not necessary to perform an additional step of forming the partition walls. This can contribute to an improvement in manufacturing efficiency.

It is preferable that an insulating film forming material used in the printing method exhibits a liquid repellent property with respect to the partition walls and exhibits a liquid affinity property with respect to a surface of the substrate.

Accordingly, in the aspect of the invention, it is possible to smoothly deposit the insulating film forming material in the spaces between the partition walls and to prevent the material from riding up the partition walls, thus preventing the formation of causes of disconnections such as protrusions.

According to another aspect of the invention, there is provided a manufacturing method of a display device including: manufacturing a touch panel by the manufacturing method described above.

Therefore, in the manufacturing method of the display device according to the aspect of the invention, it is possible to obtain a high-quality display device capable of suppressing the occurrence of disconnections or the like.

According to still another aspect of the invention, there is provided a manufacturing method of an electronic apparatus including: manufacturing a display device by the manufacturing method described above.

Therefore, in the manufacturing method of the electronic apparatus according to the aspect of the invention, it is possible to obtain a high-quality electronic apparatus capable of suppressing the occurrence of troubles caused by disconnections or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, manufacturing methods of a touch panel, a display device, and an electronic apparatus according to embodiments of the invention will be described with reference to FIGS. 1 to 13.

The following embodiments are for illustrative purpose only and not intended to limit the scope of the invention but may be arbitrarily modified within the scope of the technical spirit of the invention. In the following figures referenced hereinafter, in order to better illustrate the structures, the structures in the figures may be depicted with scales or dimensions thereof different from those of the actual structures.

First Embodiment

Touch Panel

Figure 1:
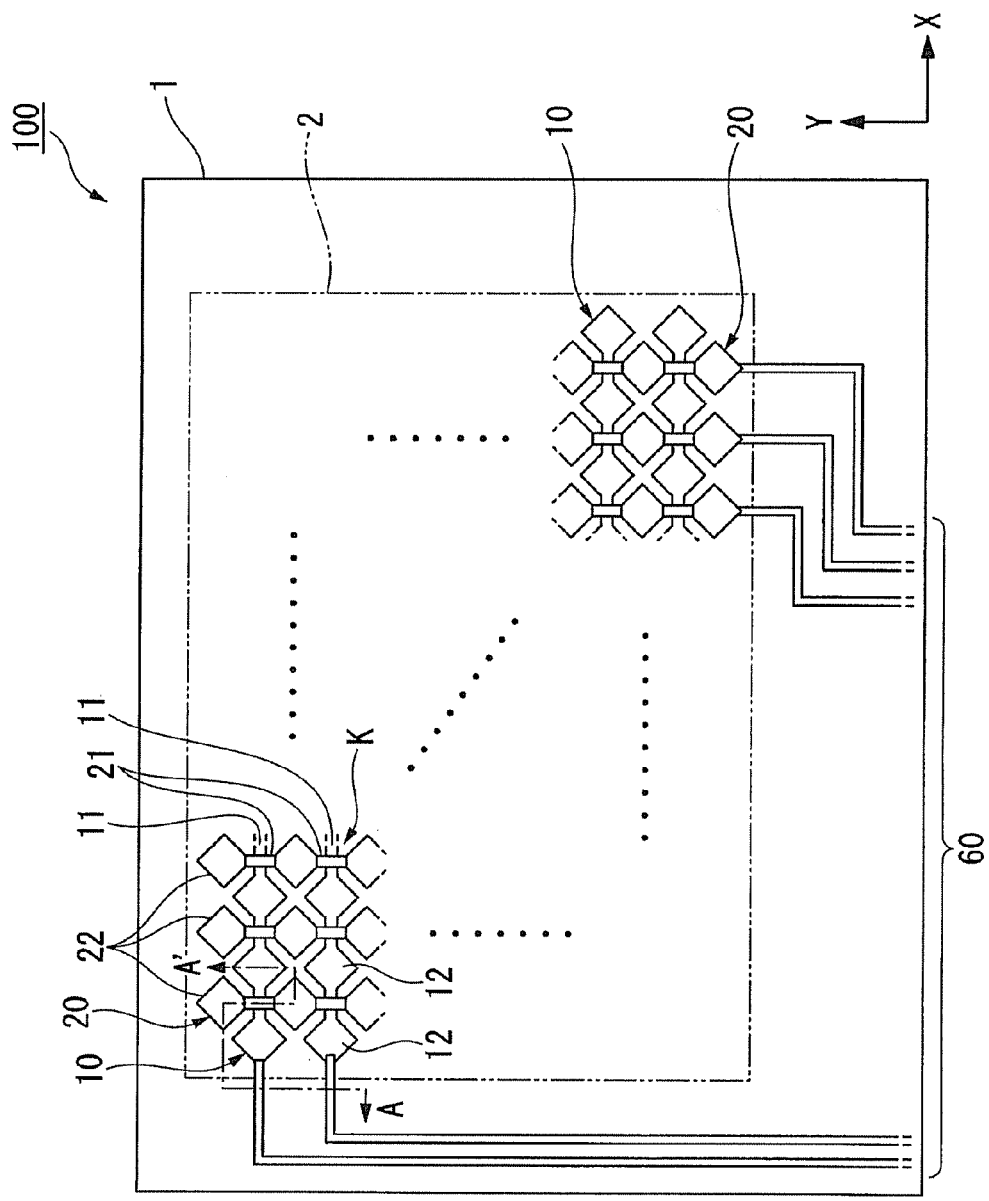
FIG. 1 is a schematic top plan view of a touch panel.
Figure 2:
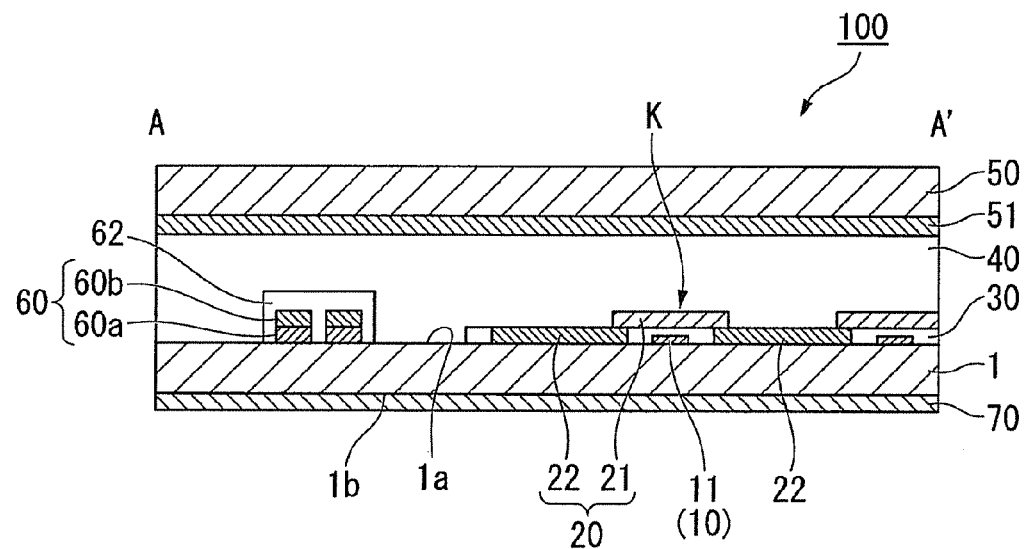
FIG. 2 is a schematic cross-sectional view of the touch panel.

FIG. 1 is a schematic top plan view of a touch panel 100 according to the embodiment. FIG. 2 is a schematic cross-sectional view of the touch panel 100 taken along the line A-A' of FIG. 1.

The touch panel 100 includes a substrate 1, an input region 2, and a lead wiring 60.

The substrate 1 is formed in a rectangular shape in plan view and a transparent material, such as glass or acrylic resin, is used as the material of the substrate 1.

The input region 2 is a region surrounded by a one-dot chain line in FIG. 1 and a region in which position information of a finger input to the touch panel is detected.

In the input region 2, a plurality of X electrodes (first electrodes) 10 and a plurality of Y electrodes (second electrodes) 20 are arrayed.

The X electrodes 10 extend along the X-axis direction in the drawing, and the X electrodes 10 are arrayed at intervals in the Y-axis direction. The Y electrodes 20 extend along the Y-axis direction in the drawing, and the Y electrodes 20 are arrayed at intervals in the X-axis direction. The X electrodes 10 and the Y electrodes 20 cross each other at intersections K in the input region 2 with respective bridge wirings crossing each other.

The X electrodes 10 includes a plurality of island-shaped electrode portions 12 being arrayed in the X-axis direction and bridge wirings 11 that connect two neighboring island-shaped electrode portions 12 to each other. The island-shaped electrode portions 12 are formed in rectangular shapes in plan view and are arrayed so that one diagonal line thereof extends along the X axis.

The Y electrodes 20 includes a plurality of island-shaped electrode portions 22 being arrayed in the Y-axis direction and bridge wirings 21 that connect two neighboring island-shaped electrode portions 22 to each other.

The island-shaped electrode portions 22 are formed in rectangular shapes in plan view and are arrayed so that one diagonal line thereof extends along the Y axis.

The island-shaped electrode portions 12 and 22 are arrayed alternately in the X and Y-axis directions (like a checker board pattern). In the input region 2, the rectangular island-shaped electrode portions 12 and 22 are arrayed in a matrix in plan view.

As materials for forming the X electrodes 10 and Y electrodes 20, light-transmissive and resistive materials such as ITO (indium tin oxide), IZO (indium zinc oxide: registered trademark), or ZnO may be used.

The lead wirings 60 are connected to the X electrodes 10 and Y electrodes 20 so as to be connected to driving portions and electrical signal converting (calculating) portions (neither of which are shown) which are provided in the internal and external devices of the touch panel 100.

Next, the cross-sectional structure of the touch panel 100 will be described with reference to FIG. 2.

The island-shaped electrode portions 12 (not shown), the island-shaped electrode portions 22, and the bridge wirings 11 are disposed on a functional surface 1a of the substrate 1. On the bridge wiring 11, an insulating film 30 is formed to a height such that the insulating film 30 is even with the island-shaped electrode portions 22. Moreover, the bridge wirings 21 are disposed on the insulating film 30. The bridge wirings 11 of the X electrodes 10 are thinner than the island-shaped electrode portions 22; for example, the bridge wirings 11 have a thickness about half that of the island-shaped electrode portions 22.

Furthermore, the lead wirings 60 are disposed on the functional surface 1a of the substrate 1. The lead wirings 60 are formed by a first layer 60a disposed on the functional surface 1a and a second layer 60b laminated on the first layer 60a. In addition, a wiring protection film 62 is formed so as to cover the lead wirings 60.

These electrodes and wirings are covered with a planarization film 40. On the planarization film 40, a protective substrate 50 is disposed with an adhesion layer 51 interposed therebetween. A shield layer 70 is provided on a back surface 1b of the substrate 1.

The insulating film 30 electrically insulates the bridge wirings 11 and 21, which cross each other in a three-dimensional manner, from each other. The insulating film 30 can be formed by coating polysiloxane, acrylic resin, acrylic monomer, or the like using a printing method and drying and solidifying the coated layer.

When polysiloxane is used, the insulating film 30 becomes an inorganic insulating film made of silicon oxide. On the other hand, when acrylic resin or acrylic monomer is used, the insulating film 30 becomes an organic insulating film made of resin material. In the present embodiment, ink obtained by mixing JSR NN525E and EDM (Diethylene Glycol Ethylmethyl Ether) to a weight percent ratio of 4:1 is used.

A material having a relative permittivity of 4.0 or less, and preferably 3.5 or less is preferably used as the constituent material of the insulating film 30. By using such a material, it is possible to reduce a parasitic capacitance at each intersection of the bridge wirings. Accordingly, it is possible to maintain the position detection performance of the touch panel.

Furthermore, a material having a refractive index of 2.0 or less, and preferably 1.7 or less is preferably used as the constituent material of the insulating film 30. By using such a material, it is possible to reduce a difference between the refractive indices of the substrate 1 and X and Y electrodes 10 and 20. Accordingly, it is possible to prevent the pattern of the insulating film 30 from being seen by users.

The first layer 60a of the lead wirings 60 is a layer in which the X electrodes 10 or the Y electrodes 20 are extended to a region outside the input region 2, and is formed of a resistive material such as ITO or IZO (indium zinc oxide: registered trademark).

Since the second layer 60b is laminated on the first layer 60a, the wiring resistance of the lead wirings 60 is reduced. The second layer 60b can be formed using organic compounds, nanoparticles, nanowires, and the like, which include as their constituent materials, at least one kind of materials selected from metals such as Au, Ag, Al, Cu, or Pd and carbons (nanocarbons such as graphite or carbon nanotubes). The constituent material of the second layer 60b is not particularly limited as long as it can reduce sheet resistance to be lower than that of the first layer 60a.

The wiring protection film 62 that covers the lead wirings 60 can be formed, similarly to the insulating film 30, by a printing method using polysiloxane, acrylic resin, acrylic monomer, or the like as a formation material. Therefore, the wiring protection film 62 can be formed simultaneously with the step of forming the insulating film 30.

Since the planarization film 40 is formed so as to cover at least the input region 2 of the functional surface 1a of the substrate 1, an uneven surface on the functional surface 1a resulting from the X electrodes 10 and the Y electrodes 20 is planarized. The planarization film 40 is preferably formed to cover approximately an entire surface (excluding external connection terminal portions) of the functional surface 1a as shown in the drawing. Since a surface of the substrate 1 on the side of the functional surface 1a is planarized by the planarization film 40, the substrate 1 and the protective substrate 50 can be uniformly bonded to each other over approximately an entire surface thereof.

Moreover, a material having a refractive index of 2.0 or less, and preferably 1.7 or less is preferably used as the constituent material of the planarization film 40. By using such a material, it is possible to reduce a difference between the refractive indices of the substrate 1 and the X and Y electrodes 10 and 20. Accordingly, it is possible to prevent the wiring pattern of the X electrodes 10 or the Y electrodes 20 from being seen by users.

The protective substrate 50 is a transparent substrate such as glass or plastics. Alternatively, when the touch panel 100 of the present embodiment is disposed on a front surface of a display device such as a liquid crystal panel or an organic EL panel, an optical device substrate (a polarization plate or a retardation plate) which is used as a part of the display device may be used as the protective substrate 50.

The shield layer 70 is formed by forming a film of a transparent conductive material such as ITO or IZO (indium zinc oxide: registered trademark) on the back surface 1b of the substrate 1. Alternatively, a film may be prepared on which a transparent conductive film serving as a shield layer is formed and such a film may be attached to the back surface 1b of the substrate 1.

The provision of the shield layer 70 can block electric field radiation into/from the back surface 1b of the substrate 1. Therefore, it is possible to prevent an electric field generated from the touch panel 100 from acting on a display device or the like and prevent an electric field generated from an external device such as a display device from acting on the touch panel 100.

Figure 3:
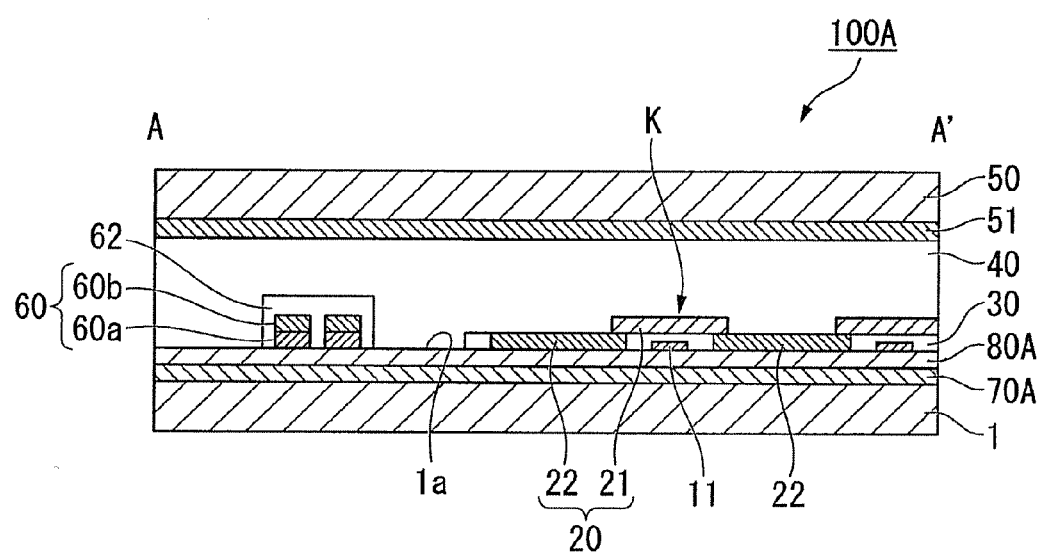
FIG. 3 is a schematic cross-sectional view of a touch panel.

Although in the present embodiment, the shield layer 70 is formed on the back surface 1b of the substrate 1, the shield layer may be formed on a surface of the substrate 1 on the side of the functional surface 1a as shown in FIG. 3. FIG. 3 is a schematic cross-sectional view of a touch panel 100A according to such a modification.

In the touch panel 100A shown in FIG. 3, a shield layer 70A is formed on the functional surface 1a of the substrate 1, and an insulating film 80A is formed so as to cover the shield layer 70A. The structure on the insulating film 80A is the same as that of the touch panel 100 shown in FIG. 2. In the touch panel 100A, since the shield layer 70A, the X electrodes 10 and the Y electrodes 20, the lead wirings 60, and the like are formed on a single surface of the substrate 1, it is possible to avoid a complicated manufacturing process, and to obtain a touch panel excellent in manufacturability.

Next, the operation principle of the touch panel 100 will be described briefly.

First, a predetermined potential is applied from a driving portion (not shown) to the X and Y electrodes 10 and 20 through the lead wirings 60.

A ground potential (earth potential), for example, is input to the shield layer 70.

In such a state where potential is supplied, when users bring their finger toward the input region 2 on the side of the protective substrate 50, a parasitic capacitor is formed between the finger in contact with the protective substrate 50 and each of the X electrodes 10 and the Y electrodes 20 in the vicinity of the contact location. Then, a temporary drop in potential occurs in the X electrodes 10 and the Y electrodes 20 where the parasitic capacitor is formed in order to charge the parasitic capacitor.

Since the driving portion is constantly sensing the potential of each electrode, it is possible to immediately detect the X electrodes 10 and the Y electrodes 20 where there is a drop in potential. The positions of the detected electrodes are analyzed by an electrical signal converting/calculating portion, and therefore, the position information of the finger on the input region 2 is detected.

Specifically, a Y-coordinate with respect to the input region 2 of the contact location of the finger is detected by the X electrodes 10 extending in the X-axis direction, and an X-coordinate with respect to the input region 2 is detected by the Y electrodes 20 extending in the Y-axis direction.

Manufacturing Method of Touch Panel

Next, a manufacturing method of the touch panel will be described.

Figure 4:
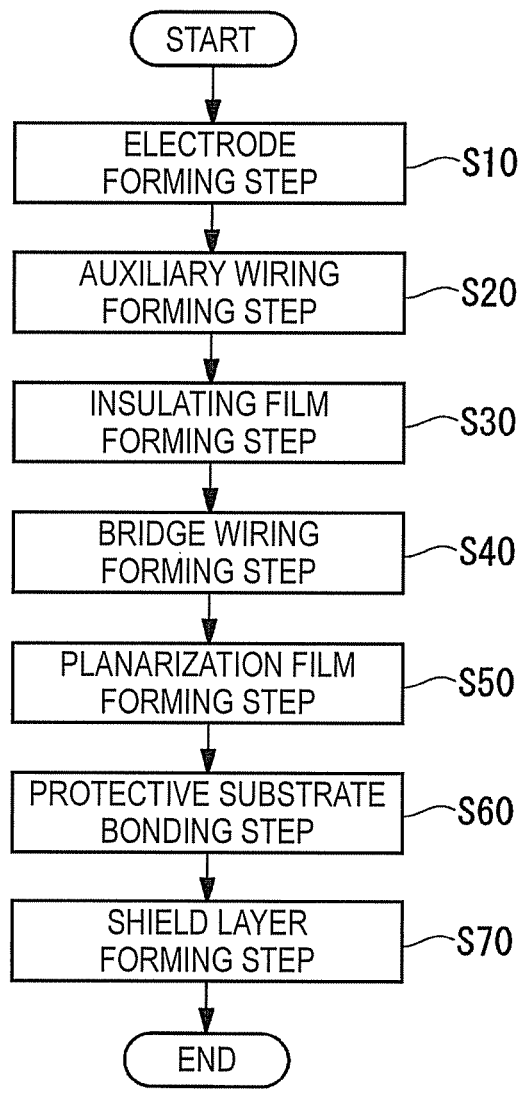
FIG. 4 is a flowchart illustrating a manufacturing method of a touch panel.

In the present embodiment, the manufacturing method of the touch panel 100 shown in FIGS. 1 and 2 will be described with reference to the drawings. FIG. 4 is a flowchart illustrating the manufacturing method of the touch panel.

As shown in FIG. 4, a manufacturing process of a touch panel according to the present embodiment includes: an electrode forming step S10 of forming the island-shaped electrode portions 12 and 22, the bridge wiring 11, and the first layer 60a of the lead wirings 60 on the functional surface 1a of the substrate 1; an auxiliary wiring forming step S20 of laminating the second layer 60b on the first layer 60a of the lead wirings 60; an insulating film forming step S30 of forming the insulating film 30 on the bridge wirings 11 and forming the wiring protection film 62 so as to cover the lead wirings 60; a bridge wiring forming step S40 of forming the bridge wirings 21 so as to connect two neighboring island-shaped electrode portions 22 to each other over the insulating film 30; a planarization film forming step (protection film forming step) S50 of forming the planarization film 40 so as to planarize a surface of the substrate 1 on the side of the functional surface 1a; a protective substrate bonding step (adhesion layer forming step) S60 of bonding the protective substrate 50 to the planarization film 40 with the adhesion layer 51 interposed therebetween; and a shield layer forming step (conductive film forming step) S70 of forming the shield layer 70 on the back surface 1b of the substrate 1.

The manufacturing process of the touch panel 100 according to the present embodiment includes a step of forming a film according to a droplet ejection method which is one kind of printing method. Here, a droplet ejection device will be described prior to the description of the manufacturing method of the touch panel.

Figure 5:
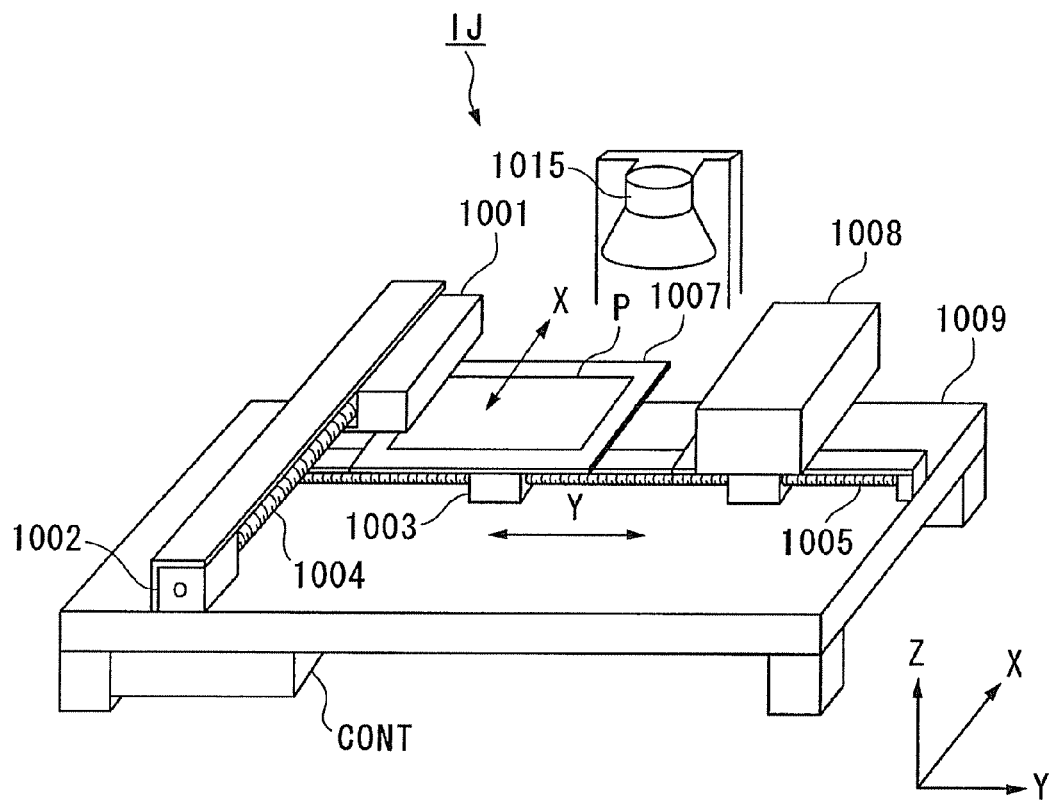
FIG. 5 is a perspective view illustrating a simplified structure of a droplet ejection device.

FIG. 5 is a perspective view illustrating a simplified structure of a droplet ejection device IJ. The droplet ejection device IJ includes a droplet ejection head 1001, an X-axis direction driving shaft 1004, a Y-axis direction guide shaft 1005, a controller CONT, a stage 1007, a cleaning mechanism 1008, a base platen 1009, and a heater 1015. As a device for ejecting a droplet, an electromechanical droplet ejection device which uses piezo elements (piezoelectric elements) is used.

The stage 1007 supports a substrate P on which a liquid material (wiring pattern ink) is disposed by the droplet ejection device IJ and includes a fixing mechanism (not shown) which fixes the substrate P at the reference position.

The droplet ejection head 1001 is a multi-nozzle droplet ejection head having a plurality of ejection nozzles, and a longitudinal direction thereof is identical to the X-axis direction. The plurality of ejection nozzles are provided at constant intervals on a lower surface of the droplet ejection head 1001. The wiring pattern ink containing conductive microparticles is ejected from the ejection nozzles of the droplet ejection head 1001 toward the substrate P supported by the stage 1007.

An X-axis direction driving motor 1002 is connected to the X-axis direction driving shaft 1004. The X-axis direction driving motor 1002 is formed by a stepping motor or the like and is configured to rotate the X-axis direction driving shaft 1004 upon receiving an X-axis driving signal from the controller CONT. When the X-axis direction driving shaft 1004 rotates, the droplet ejection head 1001 moves in the X-axis direction.

The Y-axis direction guide shaft 1005 is fixed so as not to be movable relative to the base platen 1009. The stage 1007 is provided with a Y-axis direction driving motor 1003. The Y-axis direction driving motor 1003 is formed by a stepping motor or the like and is configured to move the stage 1007 in the Y-axis direction upon receiving a Y-axis driving signal from the controller CONT.

The controller CONT supplies a voltage for controlling the ejection of liquid droplets to the droplet ejection head 1001. In addition, the controller CONT supplies drive pulse signals for respectively controlling the X and Y-axis movement of the droplet ejection head 1001 and the stage 1007 to the X-axis direction driving motors 1002 and the Y-axis direction driving motors 1003, respectively.

The cleaning mechanism 1008 performs cleaning of the droplet ejection head 1001. The cleaning mechanism 1008 is provided with a Y-axis direction driving motor (not shown). The cleaning mechanism 1008 is moved along the Y-axis direction guide shaft 1005 by the driving of the Y-axis direction driving motor. The movement of the cleaning mechanism 1008 is also controlled by the controller CONT.

The heater 1015 is a means for heating the substrate P by lamp annealing in the present embodiment and performs evaporation and drying of solvent contained in the liquid material which is disposed on the substrate P. The power of the heater 1015 is turned on/off by the controller CONT.

The droplet ejection device IJ is disposed to eject liquid droplets onto the substrate P from the plurality of ejection nozzles arrayed in the X-axis direction on the lower surface of the droplet ejection head 1001 while scanning the droplet ejection head 1001 and the stage 1007 supporting the substrate P relative to each other.

Figure 6:
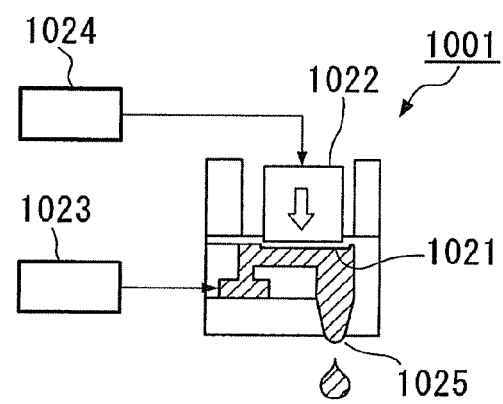
FIG. 6 is a schematic view illustrating the ejection principle of a liquid material.

FIG. 6 is a schematic view illustrating the ejection principle of a liquid material by a piezoelectric method. In FIG. 6, a piezoelectric element 1022 is disposed to be adjacent to a liquid chamber 1021 accommodating a liquid material (wiring pattern ink or functional liquid). The liquid chamber 1021 is supplied with a liquid material through a liquid material supply system 1023 that includes a material tank accommodating a liquid material. The piezoelectric element 1022 is connected to a driving circuit 1024. When voltage is applied to the piezoelectric element 1022 through the driving circuit 1024, the piezoelectric element 1022 deforms. Then, the liquid chamber 1021 deforms and the liquid material is ejected from an ejection nozzle 1025. In this case, by changing the value of applied voltage, the amount of warping of the piezoelectric element 1022 can be controlled. Moreover, by changing the frequency of applied voltage, the speed of warping of the piezoelectric element 1022 can be controlled. A piezoelectric droplet ejection method has advantages in that the composition of the liquid material hardly changes since it does not involve application of heat to the liquid material.

Next, the manufacturing method of a touch panel will be described. FIGS. 7A to 7D and FIGS. 8A to 8C are manufacturing process diagrams of the touch panel 100. These process diagrams illustrate the process steps for forming the structure (the intersections of the bridge wirings and the lead wirings 60) shown in FIG. 2.

First, the electrode forming step S10 will be described.

Figure 7A:
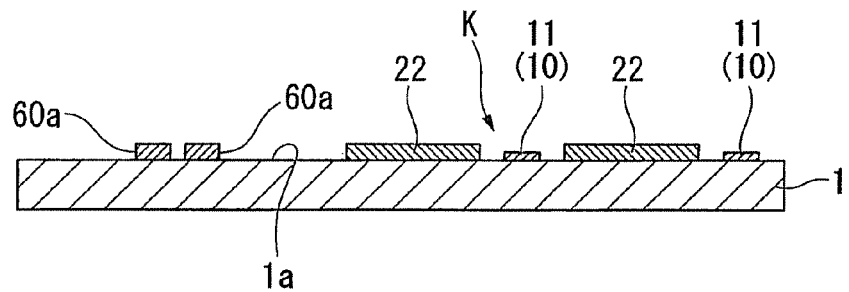
FIGS. 7A to 7D are manufacturing process diagrams of the touch panel.

In the electrode forming step S10, droplets of a liquid material containing ITO particles, for example, are selectively disposed on the substrate 1, which is a glass substrate, for example, by the droplet ejection device IJ shown in FIG. 5. Specifically, the X electrodes 10 including the island-shaped electrode portions 12 and the bridge wirings 11 are formed on the substrate 1 (first electrode forming step). Moreover, the island-shaped electrode portions 22 which are part of the Y electrodes 20 are formed on the substrate 1 (second electrode forming step). Furthermore, the patterns of liquid material including the island-shaped electrode portions 12 and the first layer 60a of the lead wirings 60 extended from the island-shaped electrode portions 22 are formed on the substrate 1. Thereafter, the liquid material (droplets) disposed on the substrate 1 are dried. In this way, as shown in FIG. 7A, the X electrodes 10 (the island-shaped electrode portions 12 and the bridge wirings 11), the island-shaped electrode portions 22, and the first layer 60a of the lead wirings 60, which are formed by a cluster of ITO particles, are formed on the substrate 1.

In this case, the amount of ejected droplets is adjusted, for example, so that the bridge wirings 11 are thinner than the island-shaped electrode portions 22. Moreover, when droplet ejection and drying are repeated plural times, the thickness of the bridge wirings 11 is made smaller than the island-shaped electrode portions 22 by adopting a procedure of decreasing the number of times of such execution. Furthermore, the Y electrodes 20 are formed so as to be divided at the intersections K so that the island-shaped electrode portions 22 are separated from each other.

In the electrode forming step S10 of the present embodiment, although an ITO film is formed by ejecting liquid droplets containing ITO particles, in addition to this, a transparent conductive film formed of IZO (indium zinc oxide: registered trademark) may be formed using liquid droplets containing particles of IZO (indium zinc oxide: registered trademark).

Moreover, in the electrode forming step S10, the patterns may be formed using a photolithography method instead of the droplet ejection method. That is to say, the X electrodes 10 (the island-shaped electrode portions 12 and the bridge wirings 11), the island-shaped electrode portions 22, and the first layer 60a of the lead wirings 60 may be formed by forming an ITO film over approximately an entire surface of the functional surface 1a of the substrate 1 by a sputtering method or the like and then patterning the ITO film using a photolithography method and an etching method.

Next, the auxiliary wiring forming step S20 is performed.

Figure 7B:
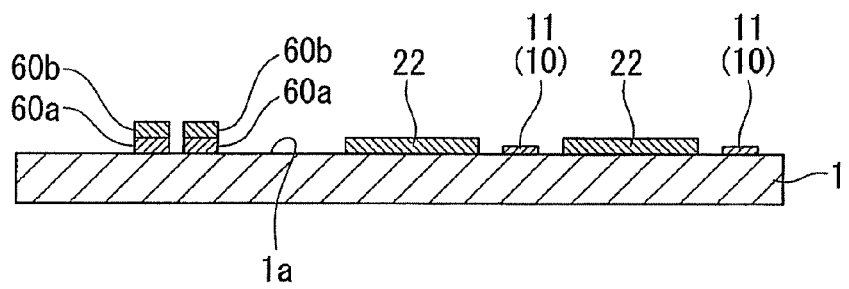

In the auxiliary wiring forming step S20, droplets of liquid material containing the constituent material of the second layer 60b of the lead wirings 60 are ejected and disposed on the first layer 60a by the droplet ejection device IJ. As the liquid material for forming the second layer 60b, a liquid material containing silver particles may be used, for example. Thereafter, the ejected and disposed liquid droplets are dried. In this way, as shown in FIG. 7B, the second layer 60b with low resistance is formed on the first layer 60a, and thus the lead wirings 60 with a two-layer structure are formed on a portion of the substrate 1 outside the input region 2.

As the liquid material for forming the second layer 60b of the lead wirings 60, besides the liquid material containing silver particles, a liquid material containing metallic particles such as Au, Al, Cu, or Pd, or a liquid material containing graphite or carbon nanotubes may be used, for example. The metallic particles and carbon particles are dispersed in the liquid material in the form of nanoparticles or nanowires. When the second layer 60b is formed of a metal film, a liquid material containing organic metal compounds may be used.

Subsequently, the insulating film forming step S30 and the bridge wiring forming step S40 are sequentially performed.

Figure 7C:
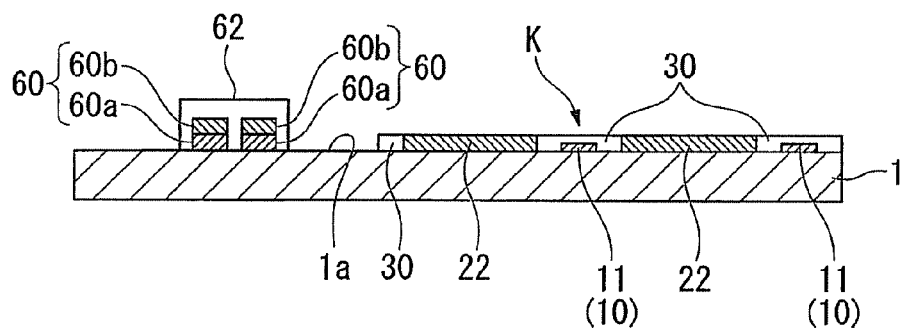
Figure 9A:
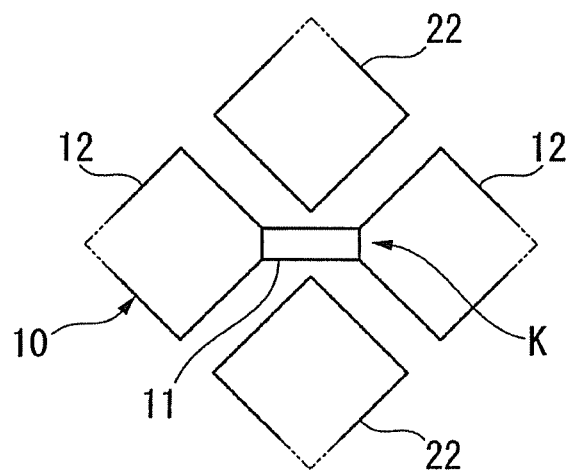
FIGS. 9A to 9C are manufacturing process diagrams of the touch panel.
Figure 9B:
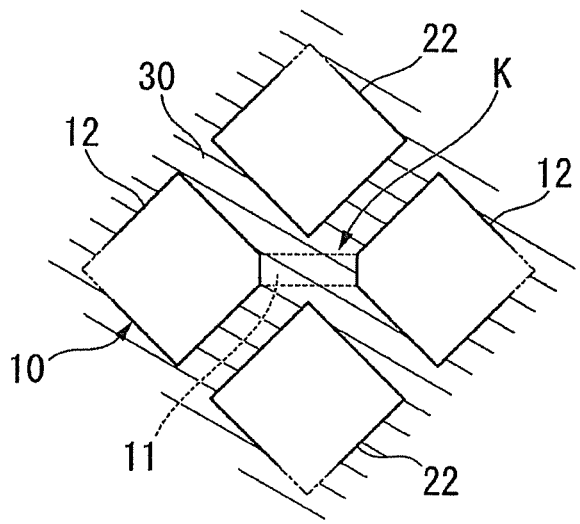
Figure 9C:
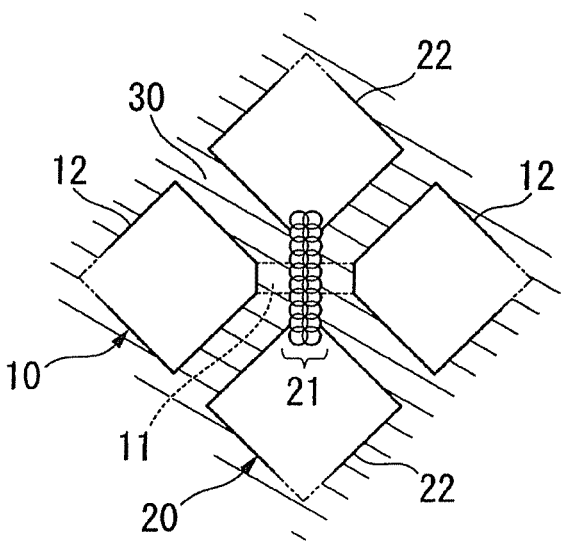

FIGS. 9A to 9C are top plan views illustrating the insulating film forming step S30 and the bridge wiring forming step S40 in more detail. FIG. 9B is a top plan view corresponding to FIG. 7C, showing a region where the bridge wirings 21 are formed. FIG. 9C is a top plan view corresponding to FIG. 7D.

The insulating film forming step S30 and the bridge wiring forming step S40 will be described with reference to FIGS. 7A to 7D and FIGS. 9A to 9C.

In the insulating film forming step S30, as shown in FIGS. 7C and 9B, liquid droplets are selectively disposed in the spaces between the island-shaped electrode portions 12 and 22 by the droplet ejection device IJ so as to bury the bridge wirings 11 of the X electrodes 10. In this case, at the intersections K, as shown in FIG. 7C, the island-shaped electrode portions 22 serve as partition walls to partition both ends in the Y-axis direction of the insulating film 30 whereby a profile shape of the insulating film 30 is defined. In the present embodiment, the profile shape of the insulating film 30 in other directions is defined as well as in the Y-axis direction.

Subsequently, the liquid material on the substrate 1 is heated so as to dry and solidify, whereby the insulating film 30 is formed over regions above the bridge wirings 11.

When the insulating film 30 is formed, it is preferable to dispose the liquid droplets without leaving any empty spaces in at least regions above the bridge wirings 11. In this way, it is possible to form the insulating film 30 without any holes or cracks reaching the bridge wirings 11, whereby insulation faults in the insulating film 30 or disconnections of the bridge wirings 21 can be prevented.

In this case, surface tension acts on the insulating film 30 at the intersections K because it is in contact with the island-shaped electrode portions 22 serving as the partition walls. Therefore, the insulating film 30 is formed to be even with the upper surface of the island-shaped electrode portions 22 in a state where occurrence of so-called swelling, where both ends of the insulating film 30 bulge upward, is suppressed.

Subsequently, as shown in FIG. 7C, liquid droplets are selectively disposed to regions above the lead wirings 60. Thereafter, the liquid material on the substrate 1 is heated so as to dry and solidify, whereby the wiring protection film 62 is formed so as to cover the lead wirings 60.

As the liquid material, a liquid material containing polysiloxane or a liquid material containing acrylic resin or acrylic monomer can be used, for example.

Subsequently, the bridge wiring forming step S40 is performed.

Figure 7D:
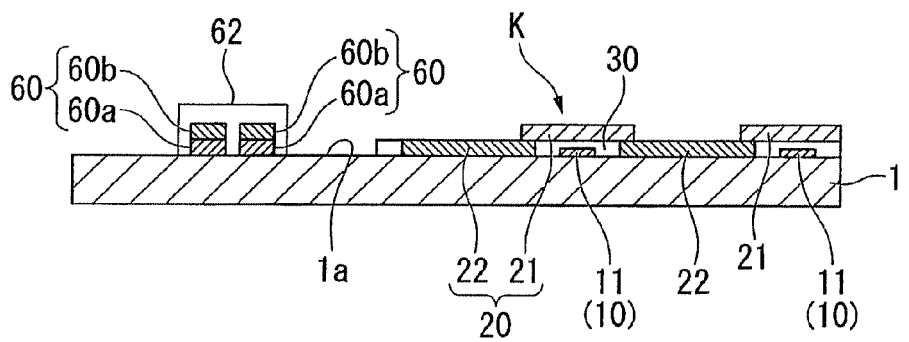

In the bridge wiring forming step S40, as shown in FIGS. 7D and 9C, droplets of liquid material containing ITO particles are disposed into a wiring shape over the neighboring island-shaped electrode portions 22 and the insulating film 30. Thereafter, the liquid material on the substrate 1 is dried and solidified. In this way, the bridge wirings 21 connecting the island-shaped electrode portions 22 to each other are formed. When the bridge wirings 21 are formed, as described above, the insulating film 30 at the intersections K, which serves as an underlying layer, is formed into approximately an even shape with the profile partitioned by the partition walls (the island-shaped electrode portions 22). Therefore, the bridge wirings 21 are formed into a straight-line shape without being bent like in the case where swelling occurs in the underlying layer.

As the liquid material used for forming the bridge wirings 21, besides the liquid material containing ITO particles, a liquid material containing IZO (indium zinc oxide: registered trademark) particles or ZnO particles may be used.

When the bridge wirings 21 are formed in the bridge wiring forming step S40, as shown in FIG. 9C, it is preferable that the bridge wirings 21 are formed using the same liquid material as used in the electrode forming step S10. That is to say, it is preferable that the same material as the constituent material of the X electrodes 10 or the island-shaped electrode portions 22 is used as the constituent material of the bridge wirings 21.

Subsequently, the planarization film forming step S50 is performed.

Figure 8A:
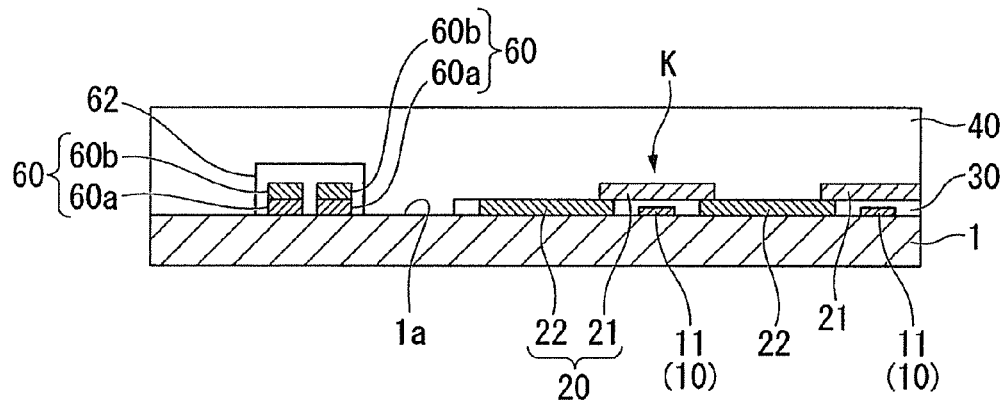
FIGS. 8A to 8C are manufacturing process diagrams of the touch panel.

In the planarization film forming step S50, as shown in FIG. 8A, for the purpose of planarizing the functional surface 1a of the substrate 1, the planarization film 40 formed of an insulating material is formed over approximately an entire surface of the functional surface 1a. The planarization film 40 may be formed using the same liquid material as the liquid material for forming the insulating film 30 used in the insulating film forming step S30. However, the planarization film 40 is preferably formed using a resin material because the aim is to planarize the surface of the substrate 1.

Subsequently, the protective substrate bonding step S60 is performed.

Figure 8B:
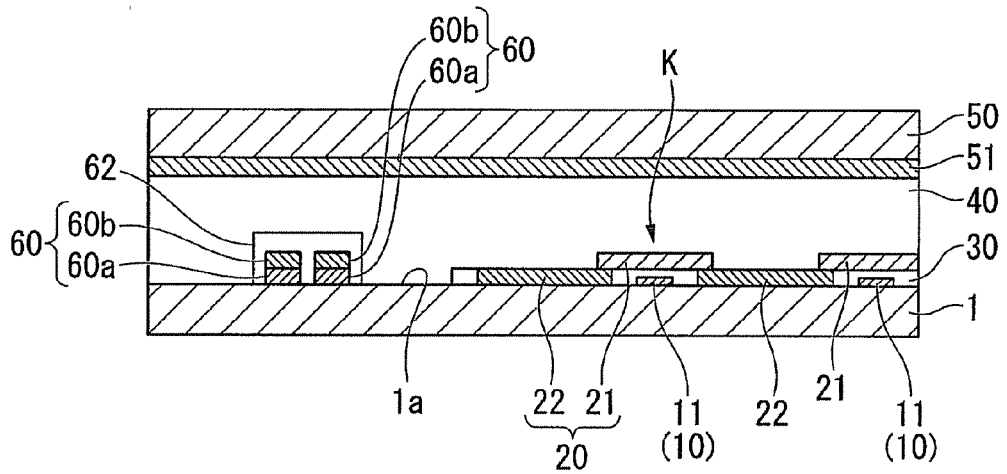

In the protective substrate bonding step S60, as shown in FIG. 8B, an adhesive is disposed between the protective substrate 50 prepared separately and the planarization film 40, such that the protective substrate 50 and the planarization film 40 are bonded to each other with the adhesion layer 51 formed of such an adhesive interposed therebetween. The protective substrate 50 may be an optical device substrate such as a polarization plate or a retardation plate in addition to a transparent substrate formed of glass or plastics. As the adhesive for forming the adhesion layer 51, a transparent resin material or the like may be used.

Subsequently, the shield layer forming step S70 is performed.

Figure 8C:
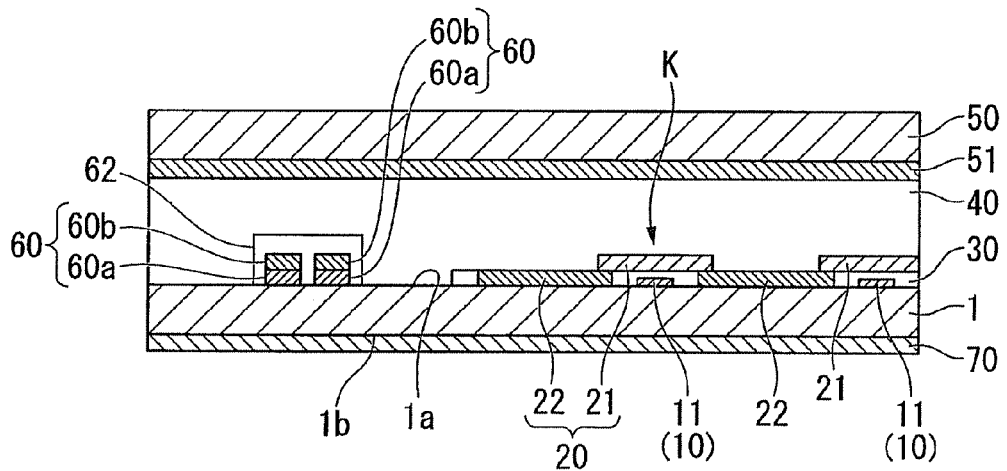

In the shield layer forming step S70, as shown in FIG. 8C, the shield layer 70 formed of a conductive film is formed on the back surface 1b of the substrate 1 (which is a surface on the opposite side of the functional surface 1a). The shield layer 70 can be formed using a well-known film-forming method such as a vacuum film-forming method, a screen printing method, an offset method, or a droplet ejection method. For example, when the shield layer 70 is formed using a printing method such as a droplet ejection method, the same liquid material containing ITO particles or the like may be used as is used in the electrode forming step S10 and the bridge wiring forming step S40.

In addition to the method of forming the shield layer 70 by forming a film on the substrate 1, a film coated with a conductive film on one or both surfaces thereof may be separately prepared and bonded to the back surface 1b of the substrate 1 such that the conductive film on the film serves as the shield layer 70.

In the present embodiment, although the shield layer 70 is formed in the final step of the manufacturing process of the touch panel, the shield layer 70 may be formed at any time. For example, the substrate 1 which is formed with the shield layer 70 in advance may be provided in any step after the electrode forming step S10. Moreover, the shield layer forming step may be performed in any step between the electrode forming step S10 and the protective substrate bonding step S60.

Moreover, in the present embodiment, although the shield layer 70 is formed on the back surface 1b of the substrate 1, when the shield layer 70A is formed on a surface of the substrate 1 on the side of the functional surface 1a similar to the touch panel 100A according to the modification shown in FIG. 3, a step of forming the shield layer 70A and a step of forming the insulating film 80A are formed prior to the electrode forming step S10. In this case, the shield layer 70A can be formed by the same method as the shield layer forming step S70. Moreover, the step of forming the insulating film 80A can be performed in a manner similar to the insulating film forming step S30, for example.

According to the manufacturing method of the touch panel 100 described in detail above, the following advantages can be obtained. First, in the manufacturing method of the present embodiment, the X electrodes 10 (the island-shaped electrode portions 12 and the bridge wirings 11) and the island-shaped electrode portions 22 forming the Y electrodes are formed at the same surface on the substrate 1. Thereafter, the insulating film 30 is formed on regions above the bridge wirings 11 using a droplet ejection method. Thereafter, the bridge wirings 21 connecting the island-shaped electrode portions 22 to each other are formed by the droplet ejection method. Since the connection structure of the Y electrodes 20 crossing the X electrodes 10 is formed using the droplet ejection method which is one kind of a printing method, it is possible to reduce the number of necessary process steps compared to the related art and to decrease the manufacturing cost of the touch panel.

More specifically, a connection structure forming step of the related art further requires the following three steps subsequent to the step shown in FIG. 7A. (1) A step of forming an interlayer insulating film so as to cover the X electrodes 10 and the island-shaped electrode portions 22. (2) A step of forming contact holes in the interlayer insulating film so as to bridge the bridge wirings between neighboring two island-shaped electrode portions 22. (3) A step of connecting the island-shaped electrode portions 22 by forming the pattern of bridge wirings in regions including the contact holes.

As is clear from the comparison between the process steps of the related art and the process steps of the present embodiment, the manufacturing method according to the present embodiment does not require the performing of the photolithography step (and the etching step) for forming contact holes in the interlayer insulating film, which is required in the related art, and also does not require the photolithography step and the etching step for forming the pattern of the bridge wirings.

Therefore, according to the manufacturing method of the present embodiment, it is possible to reduce the number of photolithography steps which are costly and to decrease the manufacturing cost of the touch panel. Moreover, since the droplet ejection method selectively disposes liquid droplets in only regions where respective films are formed, it is possible to suppress the amount of material consumed. This reduces the manufacturing cost in terms of raw material cost.

Moreover, in the present embodiment, since the insulating film 30 is formed by using the island-shaped electrode portions 22 at the intersections K as the partition walls, it is possible to prevent adverse effects such as bending of the bridge wirings 21 due to swelling and to thus manufacture the high-quality touch panel 100 where disconnections or the like do not occur. Particularly, in the present embodiment, since the island-shaped electrode portions 22 are used as the partition walls, it is not necessary to perform an additional step of forming the partition walls. This can contribute to an improvement in manufacturing efficiency. Furthermore, in the present embodiment, the bridge wirings 11 of the X electrodes 10 are formed to be thinner than the island-shaped electrode portions 22, and the insulating film 30 is formed to be approximately even with the upper surface of the island-shaped electrode portions 22. Therefore, since the bridge wirings 21 are disposed on an approximately flat surface which is formed by the insulating film 30 and the island-shaped electrode portions 22 without being bent, it is possible to more effectively avoid disconnections of the bridge wirings 21.

Figure 10A:
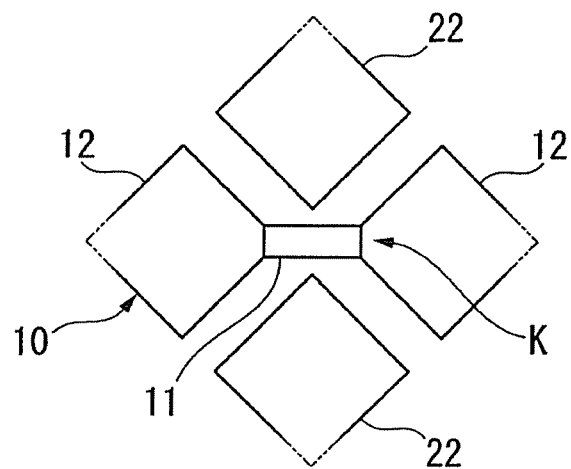
FIGS. 10A to 10C illustrate another example of manufacturing process diagrams of the touch panel.
Figure 10B:
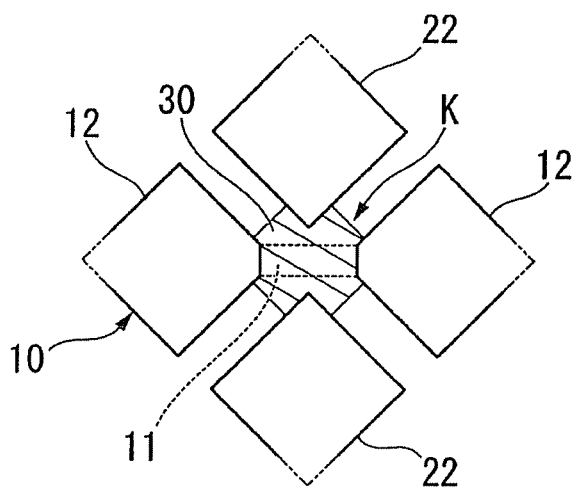
Figure 10C:
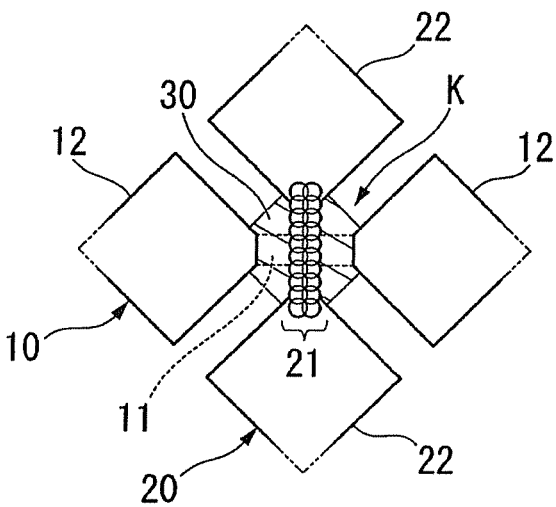

In addition, in the embodiment described above, although the insulating film 30 is formed around the island-shaped electrode portions 12 and 22 in the insulating film forming step S30 as shown in FIGS. 9A to 9C, the insulating film may be formed in only regions covering the bridge wirings 11 at the intersections K as shown in FIGS. 10A to 10C.

In this case, since a region where the insulating film 30 is formed can be reduced to the maximum, it is possible to reduce material costs and to reduce the number of steps required for film-forming.

Second Embodiment

Next, a manufacturing method of a touch panel according to a second embodiment of the invention will be described with reference to FIGS. 11A to 11D.

The same constituent elements as the constituent elements of the first embodiment shown in FIGS. 1 to FIGS. 10A to 10C will be denoted by the same reference numerals, and description thereof will be omitted.

In the first embodiment, although the island-shaped electrode portions 22 are used as the partition walls when forming the insulating film 30, the present embodiment will be described for a case where a non-exposed resist, among the resists (photosensitizing agent) which are deposited when forming the patterns of the island-shaped electrode portions 12 and 22 using a photolithography method, is used as a partition wall.

Figure 11A:
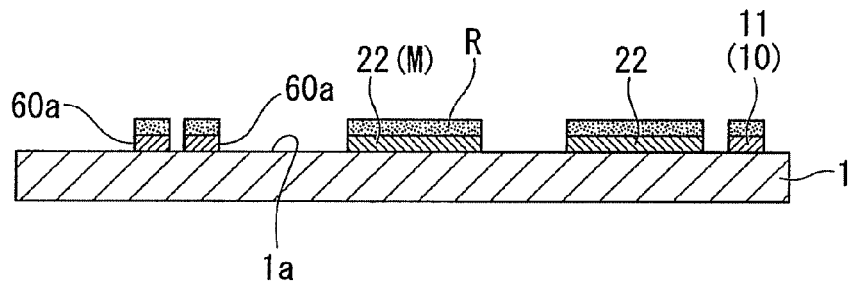
FIGS. 11A to 11D are manufacturing process diagrams of a touch panel according to a second embodiment.

First, as shown in FIG. 11A, an ITO film M is formed over an entire surface of the substrate 1 by a sputtering method or the like, and then a resist (photosensitizing agent) R is formed thereon by a spinning method or the like. Furthermore, by performing exposure using a mask having a shape corresponding to the island-shaped electrode portions 12 and 22 and the lead wirings 60 and then performing developing and etching processes, the ITO film M and the resist R formed at regions outside the island-shaped electrode portions 12 and 22 and the lead wirings 60 are removed.

In this case, the bridge wirings 11 and 21 have not been formed yet.

Figure 11B:
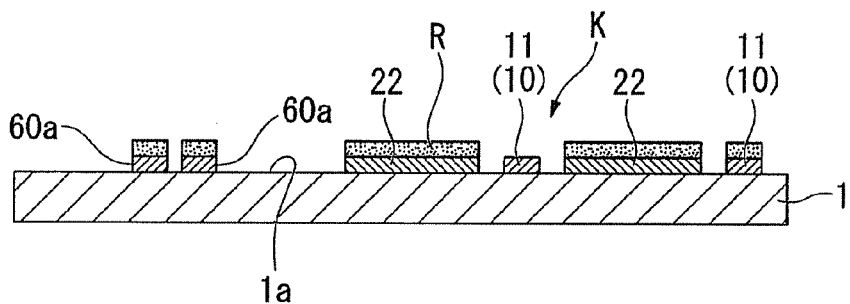

Subsequently, in a state where the resist R remains on the island-shaped electrode portions 12 and 22 and the lead wirings 60, the bridge wirings 11 are formed by the above-described droplet ejection method or the like so as to connect the island-shaped electrode portions 12 to each other at the intersections K as shown in FIG. 11B. In the present embodiment, the bridge wirings 11 are formed with the same thickness as the thickness of the island-shaped electrode portions 12 and 22.

Figure 11C:
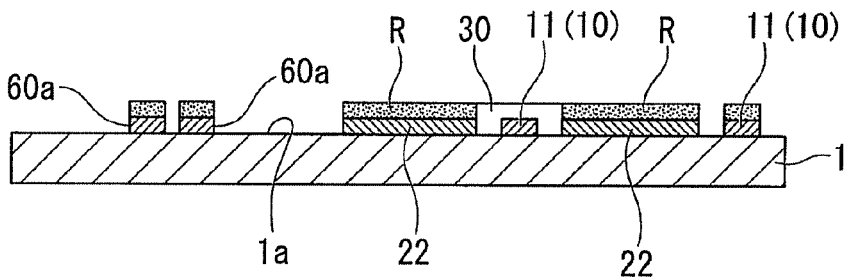

Subsequently, as shown in FIGS. 11C, liquid droplets are selectively disposed in the spaces between the island-shaped electrode portions 12 and the resist R by the droplet ejection device IJ so as to bury the bridge wirings 11 of the X electrodes 10 at the intersections K. In this case, at the intersections K, as shown in FIG. 11C, the island-shaped electrode portions 22 and the resist R serve as partition walls to partition both ends in the Y-axis direction of the insulating film 30 whereby a profile shape of the insulating film 30 is defined.

In this case, surface tension acts on the insulating film 30 at the intersections K because it is in contact with the resist R serving as the partition walls. Therefore, the insulating film 30 is formed to be approximately even with the upper surface of the resist R in a state where occurrence of so-called swelling, where both ends of the insulating film 30 bulge upward, is suppressed.

Figure 11D:
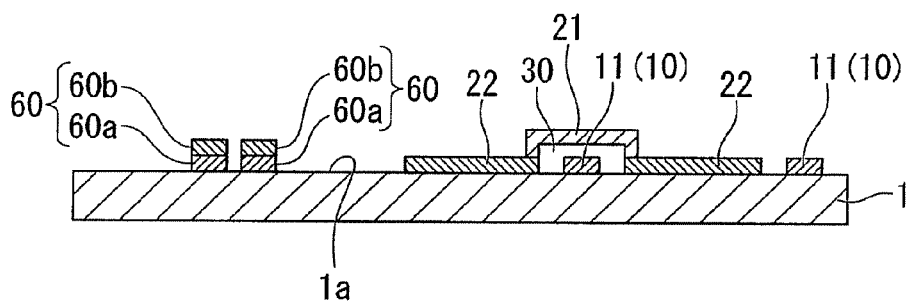

Subsequently, as shown in FIGS. 11D, the remaining resist R is removed by an etching treatment, and droplets of liquid material containing ITO particles are disposed into a wiring shape over the neighboring island-shaped electrode portions 22 and the insulating film 30 by a droplet ejection method. Thereafter, the liquid material on the substrate 1 is dried and solidified. In this way, the bridge wirings 21 connecting the island-shaped electrode portions 22 to each other are formed. Subsequently, the touch panel 100 can be manufactured by the same process steps as in the first embodiment.

According to the present embodiment, in addition to the same operational advantages as in the first embodiment, since the bridge wirings 11 can be formed with the same thickness as that of other electrodes, it is easy to obtain a desired conduction resistance.

Display Device

Figure 12A:
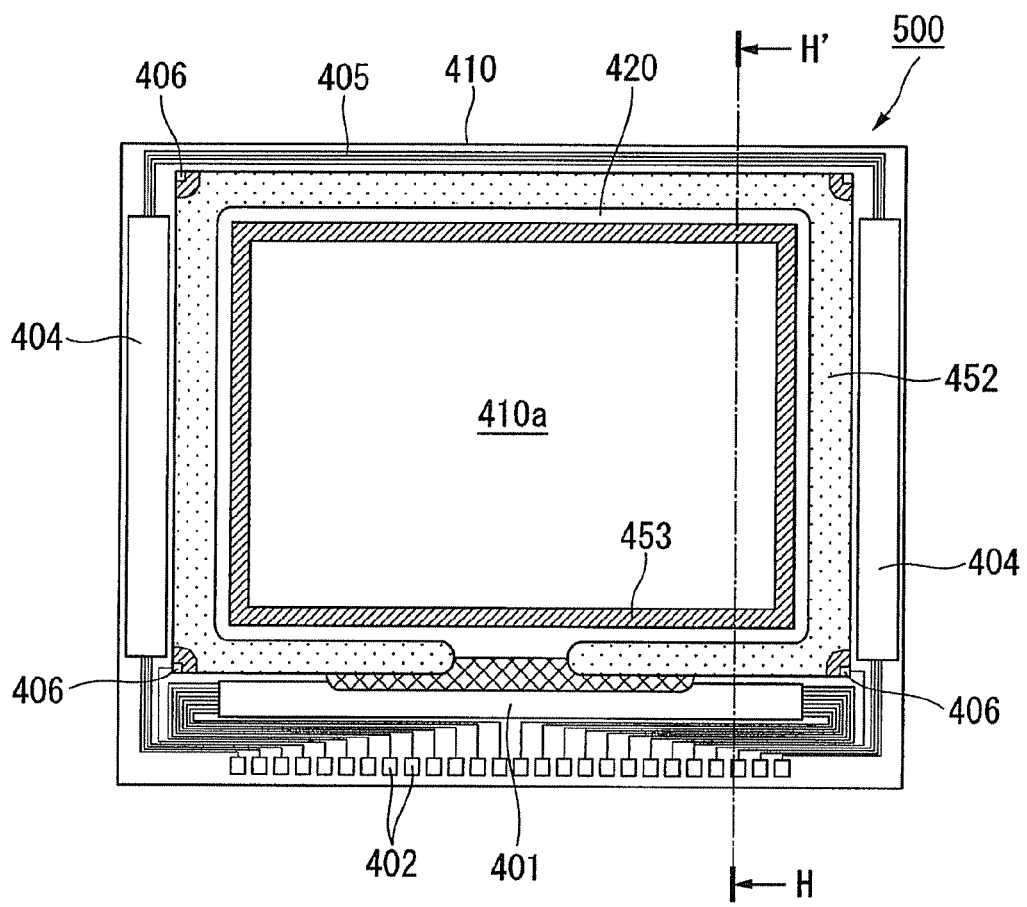
FIGS. 12A and 12B are schematic top plan view and cross-sectional view of a liquid crystal display device.
Figure 12B:
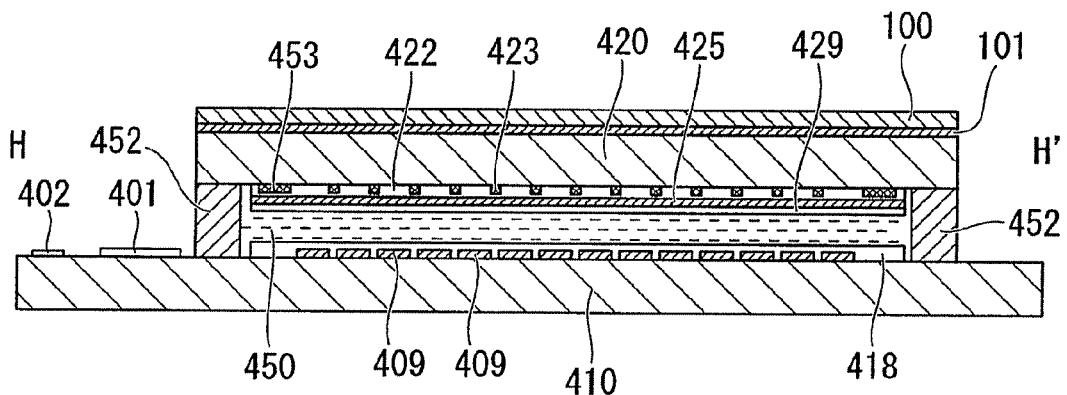

Next, a display device having the touch panel of the invention will be described. In the present embodiment, a liquid crystal display device having a touch panel will be described as an example of a display device. FIGS. 12A and 12B are schematic views of a liquid crystal display device 500 according to an embodiment of the invention, in which FIG. 12A is a top plan view, and FIG. 12B is a cross-sectional view taken along the line H-H' in FIG. 12A.

As shown in FIG. 12A, the liquid crystal display device 500 includes a device substrate 410, a counter substrate 420, and an image display region 410a.

The device substrate 410 is a rectangular substrate having a larger planar region than the counter substrate 420. The counter substrate 420 is an image display side of the liquid crystal display device 500 and is a transparent substrate formed of glass, acrylic resin or the like. The counter substrate 420 is bonded to a middle portion of the device substrate 410 by a sealing member 452.

The image display region 410a is a planar region of the counter substrate 420 and is an inner region of a peripheral partition portion 453 provided along the inner circumference of the sealing member 452.

On a portion of the device substrate 410 around the counter substrate 420, a data line driving circuit 401, scanning line driving circuits 404, connection terminals 402 connected to the data line driving circuit 401 and the scanning line driving circuits 404, wirings 405 connecting the scanning line driving circuits 404 each other disposed opposite the counter substrate 420, and the like are arrayed.

Next, a cross-sectional structure of the liquid crystal display device 500 will be described.

On a surface of the device substrate 410 on the side of a liquid crystal layer 450, pixel electrodes 409, an alignment film 418, and the like are laminated.

On a surface of the counter substrate 420 on the side of the liquid crystal layer 450, a light shielding film (black matrix) 423, a color filter 422, a common electrode 425, an alignment film 429, and the like are laminated.

The liquid crystal layer 450 is interposed by the device substrate 410 and the counter substrate 420.

Moreover, on an outer surface of the counter substrate 420 (which is on an opposite side of the liquid crystal layer 450), the touch panel 100 of the invention is disposed with an adhesion layer 101 interposed therebetween.

According to the liquid crystal display device described above, the following advantages can be obtained.

The touch panel 100 provided in the liquid crystal display device 500 includes the electrodes for position detection and the insulating film crossing the electrodes which are formed by a droplet ejection method. Therefore, since the cost associated with manufacturing the touch panel is reduced, it is possible to obtain a liquid crystal display device with reduced manufacturing costs.

Moreover, the touch panel provided in the liquid crystal display device may be the touch panel 100A according to the modification of the first embodiment or the touch panel 200 according to the second embodiment. Since these touch panels are also manufactured by the process step of forming films by the droplet ejection method, manufacturing costs are reduced. Therefore, it is possible to decrease the manufacturing cost of the liquid crystal display device.

Furthermore, in the liquid crystal display device of the present embodiment, it is preferable to form the respective layers of the touch panel on the outer surface of the counter substrate 420 (which is on the opposite side of the liquid crystal layer 450). In this way, since it is possible to share the counter substrate 420 of the liquid crystal display device with the substrate 1 of the touch panel, it is possible to further reduce the manufacturing costs and to decrease the weight of the liquid crystal display device.

Furthermore, in the present embodiment, although the liquid crystal display device is described, besides this, the touch panel of the invention can be suitably used in a display device such as an organic EL device or an electrophoresis display device.

Figure 13:
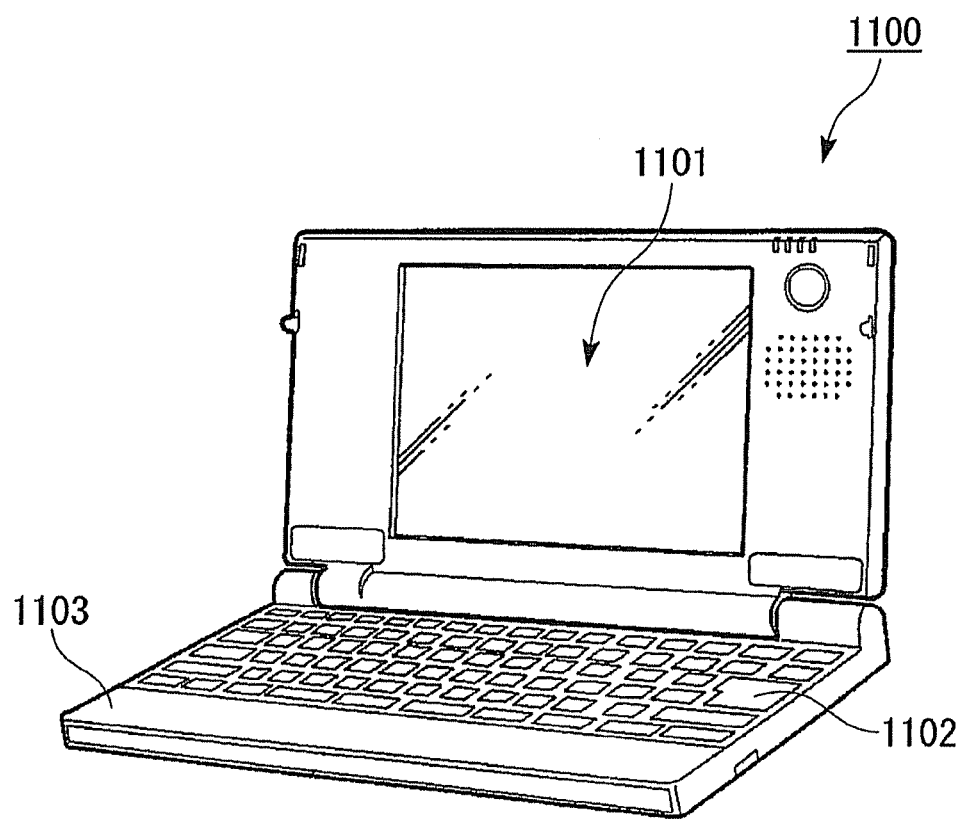
FIG. 13 is a perspective view illustrating an example of an electronic apparatus according to the invention.

Next, an example of an electronic apparatus will be described which has the touch panel of the invention or a liquid crystal display device incorporating the touch panel. FIG. 13 is a perspective view illustrating a mobile personal computer 1100. The mobile personal computer 1100 includes a display portion 1101 and a body portion 1103 incorporating a keyboard 1102. The mobile personal computer 1100 is equipped with the liquid crystal display device 500 of the embodiment in the display portion 1101. According to the mobile personal computer 1100 having such a configuration, since the touch panel of the invention is used in the display portion, it is possible to obtain an electronic apparatus with reduced manufacturing costs.

The electronic apparatus is an example of the electronic apparatus of the invention but does not limit the technical scope of the invention. For example, the touch panel of the invention can be suitably used in a display portion of a cellular phone, a portable audio player, a personal digital assistant (PDA), and the like.

Although the exemplary embodiments of the invention have been described with reference to the accompanying drawings, it should be understood that the invention is not limited to such embodiments. Various shapes or combinations of respective constituent elements shown in the above-described embodiments are merely examples, and various changes may be made depending on design requirements or the like without departing from the spirit or scope of the invention.

For example, although not mentioned in the embodiments, as an insulating film forming material used when forming the insulating film 30 by a droplet ejection method, it is preferable to use a material which exhibits liquid repellent properties to the resist R and the island-shaped electrode portions 22 serving as the partition walls and exhibits liquid affinity properties to the surface of the substrate 1.

For example, the above-described ink has a contact angle of 19° with respect to the substrate 1 of SiO2 and a contact angle of 25° with respect to the ITO electrode portions. By subjecting the substrate 1 having the electrode portions to an excimer UV treatment, it is possible to obtain a contact angle of 10° with respect to the substrate 1 and a contact angle of 25° with respect to the electrode portions.

With this configuration, it is possible to smoothly deposit the insulating film forming material in the spaces between the partition walls and to prevent the material from riding on the partition walls. Accordingly, it is possible to prevent the formation of causes of disconnections such as protrusions.

Moreover, in the embodiments, although the insulating film 30 is formed to be approximately even with the upper surface of the partition walls, the invention is not limited to this, but the insulating film 30 may be formed to a height lower or higher than the upper surface of the partition walls, for example. When the insulating film 30 is formed to be higher than the upper surface of the partition walls, it is preferable to control the protrusion amount to be very small so that swelling hardly occurs.

Furthermore, in the embodiments, although the island-shaped electrode portions 22 and the resist R are used as the partition walls, the invention is not limited to this, partition walls for forming the insulating film may be formed separately. In this case, it is also possible to suppress the occurrence of swelling of the insulating film and to form high-quality bridge wirings with less bends.

The entire disclosure of Japanese Patent Application No. 2009-059493, filed Mar. 12, 2009 is expressly incorporated by reference herein.

What is claimed is:

1. A manufacturing method of a touch panel having a plurality of first electrodes and a plurality of second electrodes which are formed on one surface of a substrate and extend in directions crossing each other, the method comprising:

forming the second electrodes so as to be separated at intersections between the first and second electrodes on the substrate;

forming the first electrodes at the intersections on the substrate;

forming an insulating film at least on the first electrodes at the intersections using a printing method; and forming bridge wirings that connect upper surfaces of the second electrodes separated at the intersections to each other over the insulating film using the printing method, wherein forming partition walls for partitioning at least a part of a profile shape of the insulating film is performed prior to the forming of the insulating film, and the partition walls are configured with edges of the separated second electrodes, the first electrodes at the intersections are formed so as to be thinner than the second electrodes, the insulating film is formed on top surfaces and side surfaces of the first electrodes and is in contact with the side surfaces of the first electrodes, and the insulating film is formed between the edges of the separated second electrodes so as to be approximately even with the upper surfaces of the second electrodes, and the bridge wirings are formed in a straight-line shape on the second electrodes and the insulating film.

2. The manufacturing method of the touch panel according to claim 1, wherein the partition walls include the second electrodes separated at the intersections.

3. The manufacturing method of the touch panel according to claim 1, further comprising:
forming the second electrodes on the entire surface of the substrate;
applying a photosensitizing agent onto the second electrodes;
exposing the photosensitizing agent located at the intersections; and
removing the exposed photosensitizing agent and the second electrodes which are located at the intersections,
wherein the partition walls are the unexposed photosensitizing agent which remains after the removing of the exposed photosensitizing agent.

4. The manufacturing method of the touch panel according to claim 1,
wherein an insulating film forming material used in the printing method exhibits a liquid repellent property with respect to the partition walls and exhibits a liquid affinity property with respect to a surface of the substrate.

5. A manufacturing method of a display device comprising:
manufacturing a touch panel by the manufacturing method according to claim 1.

6. A manufacturing method of an electronic apparatus comprising:
manufacturing a display device by the manufacturing method according to claim 5.

7. The manufacturing method of the touch panel according to claim 1, further includes forming lead wirings on the substrate, wherein
the lead wirings are formed by a first layer and a second layer that is laminated on the first layer, and the second layer has a low resistance value so as to have a lower sheet resistance than the first layer.

8. A manufacturing method of a touch panel having a plurality of first electrodes and a plurality of second electrodes which are formed on one surface of a substrate and extend in directions crossing each other, the method comprising:

forming the second electrodes so as to be separated at intersections between the first and second electrodes on the substrate;
forming the first electrodes at the intersections on the substrate;
forming an insulating film at least on the first electrodes at the intersections using a printing method; and
forming bridge wirings that connect upper surfaces of the second electrodes separated at the intersections to each other over the insulating film using the printing method,
wherein forming partition walls for partitioning at least a part of a profile shape of the insulating film is performed prior to the forming of the insulating film, and the partition walls are configured with edges of the separated second electrodes,
the first electrodes at the intersections are formed so as to be thinner than the second electrodes,
the insulating film is formed on top surfaces and side surfaces of the first electrodes and is in contact with the side surfaces of the first electrodes, the insulating film is formed between the edges of the separated second electrodes so as to be approximately even with the upper surfaces of the second electrodes, and the insulating film is made of a material having a relative permittivity of 4.0 or less and having a refractive index of 2.0 or less, and
the bride wirings are formed in a straight-line shape on the second electrodes and the insulating film.

9. The manufacturing method of the touch panel according to claim 8,
wherein the partition walls include the second electrodes separated at the intersections.

10. The manufacturing method of the touch panel according to claim 8, further includes forming lead wirings on the substrate, wherein
the lead wirings are formed by a first layer and a second layer that is laminated on the first layer, and the second layer has a low resistance value so as to have a lower sheet resistance than the first layer.

* * * * *